(12) United States Patent
Bley

(10) Patent No.: US 7,783,679 B2
(45) Date of Patent: Aug. 24, 2010

(54) EFFICIENT PROCESSING OF TIME SERIES DATA

(75) Inventor: John B. Bley, San Mateo, CA (US)

(73) Assignee: Computer Associates Think, Inc., Islandia, NY (US)

( * ) Notice: Subject to any disclaimer, the term of this patent is extended or adjusted under 35 U.S.C. 154(b) by 359 days.

(21) Appl. No.: 11/033,589

(22) Filed: Jan. 12, 2005

(65) Prior Publication Data

US 2006/0173878 A1 Aug. 3, 2006

(51) Int. Cl.
*G06F 7/00* (2006.01)
*G06F 17/30* (2006.01)

(52) U.S. Cl. ..................................... 707/809
(58) Field of Classification Search ............... 707/101, 707/809, 999.101
See application file for complete search history.

(56) References Cited

U.S. PATENT DOCUMENTS

| | | | |
|---|---|---|---|
| 5,119,465 A * | 6/1992 | Jack et al. .................... | 717/137 |
| 5,655,081 A | 8/1997 | Bonnell et al. | |
| 5,898,873 A | 4/1999 | Lehr | |
| 5,978,594 A | 11/1999 | Bonnell et al. | |
| 6,260,187 B1 * | 7/2001 | Cirne ......................... | 717/110 |
| 6,332,212 B1 | 12/2001 | Organ et al. | |
| 6,741,978 B1 * | 5/2004 | Rhoads et al. ................. | 707/1 |
| 6,928,471 B2 | 8/2005 | Pabari et al. | |
| 2004/0075690 A1 * | 4/2004 | Cirne ......................... | 345/771 |
| 2004/0193740 A1 * | 9/2004 | Kasmirsky et al. ............. | 710/1 |
| 2004/0237093 A1 | 11/2004 | Sluiman et al. | |
| 2005/0149584 A1 * | 7/2005 | Bourbonnais et al. ........ | 707/204 |
| 2006/0101095 A1 * | 5/2006 | Episale et al. ................ | 707/204 |

OTHER PUBLICATIONS

Hsiao, "Test and Evaluation Software for a Prototype Network of Water Level Measurment Stations," Sep. 1, 1986, 358-363.*
Malan et al., "An Extensible Probe Architecture for Network Protocol Performance Measurement," Oct. 1, 1998, 215-227.*
Bachman, "The Evolution of Storage Structures," Jan. 1, 1972, 628-634.*
Korn et al., "Efficiently Supporting Ad Hoc Queries in Large Datasets of Time Sequences," Jan. 1, 1997, 289-300.*
Carney et al., "Monitoring Streams—A New Class of Data Management Applications," Jan. 1, 2002.*

* cited by examiner

*Primary Examiner*—John E Breene
*Assistant Examiner*—Aleksandr Kerzhner
(74) *Attorney, Agent, or Firm*—Vierra Magen Marcus & DeNiro LLP

(57) ABSTRACT

A system receiving time series data will store the data in a first format suited for quick writing. That data will subsequently be converted from the first format to a second format better suited than the first format for compact storage and queries. Over time, the data in the second format can be aggregated and/or down sampled. In one embodiment, the first format includes a set of blocks of information, with each block of information storing data for a set of metrics during a time period. The second format includes a header, a set of blocks of data and a footer. Each bock of data in the second format stores information for a metric over multiple time periods. The footer includes pointers to each block of data.

12 Claims, 10 Drawing Sheets

EFFICIENT PROCESSING OF TIME SERIES DATA

BACKGROUND OF THE INVENTION

1. Field of the Invention

The present invention relates to technology for processing data.

2. Description of the Related Art

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live (web and/or non-web) applications and web sites to make sure that they are running properly.

When an application is performing poorly or improperly, the developer or administrator usually attempts to debug the software to figure out which code is causing the performance issues so that code can be fixed. While it is usually easy to detect when an application is performing poorly or improperly, it is often very difficult to determine which portion of the software is responsible for the poor performance.

Application performance analysis tools are popular tools are used to debug software and to analyze an application's run time execution. Many application performance analysis tools provide time series data regarding measurements made about the various components of a system (e.g., application) being monitored. Time series data regarding measurements is time sensitive data that changes over time and includes multiple samples taken over time. Typical systems will acquire timer series data about various metrics. A metric is a measurement of an activity. Examples of metrics includes (but are not limited to) method timers, remote invocation method timers, thread counters, network bandwidth, servlet timers, Java Server Pages timers, systems logs, file system input and output bandwidth meters, available and used memory, Enterprise JavaBean timers, and other measurements of other activities.

A typical deployed application performance analysis tools may continuously acquire data for several thousand metrics. In some cases, the application performance analysis tool may not be able to store all of that data because it cannot write the data fast enough or there is not enough room to store the data When data is discarded, the ability to debug an application is degraded. Thus, there is a need to more efficiently maintain more data.

SUMMARY OF THE INVENTION

Technology is described herein for separating the demands of compact data and fast queries needed for long term storage from the desire to be able to write data quickly when received. Thus, received time series measurement data will be written using a first format suited for fast writing. Subsequently, that time series measurement data will be converted from the first format to a second format suited for compact storage and/or reasonable query times. In some embodiments, the data in the second format can be aggregated and/or down sampled over time. In one embodiment, the first format includes a set of blocks of information, with each block of information data for a set of metrics pertaining to a respective time period. The second format includes a header, a set of blocks of data and a footer. Each bock of data in the second format stores information for a metric over multiple time periods. The footer includes pointers to each block of data. This system for processing time series data can be used with application performance analysis tools or other tools/applications/environments.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software (stored on a storage device) implementing the present invention is used to program one or more processors. The one or more processors can be in communication with one or more storage devices, peripherals and/or communication interfaces.

DETAILED DESCRIPTION

The technology described herein pertains to efficiently processing time series data. For example, technology is described for separating the demands of compact data and fast queries needed for long term storage from the desire to be able to write data quickly when received. This technology can be used with may different systems and types of data. In one embodiment, the time series data is generated by an application performance analysis tool which modifies object code of an application to be able to analyze the performance of the application. In other embodiments, the technology described herein can be used with systems other than application performance analysis tools. Prior to describing how the example system processes the data, a discussion will first be provided that explains the example application performance analysis tool which modifies the object code of the application to be monitored.

Object code can be generated by a compiler or an assembler. Alternatively, object code can be generated manually. Object code can be machine executable or suitable for processing to produce executable machine code. Modifying object code includes adding new instructions to the object code and/or modifying existing portions of the object code. Modifying object code typically does not involve accessing the source code. An example of modifying object code can be found in the following patent documents which are incorporated herein by reference in their entirety: U.S. Pat. No. 6,260,187 "System For Modifying Object Oriented Code;" U.S. patent application Ser. No. 09/795,901, "Adding Functionality To Existing Code At Exits;" U.S. patent application Ser. No. 10/692,250, "Assessing Information At Object Creation;" and U.S. patent application Ser. No. 10/622,022, "Assessing Return Values And Exceptions."

Figure 1:
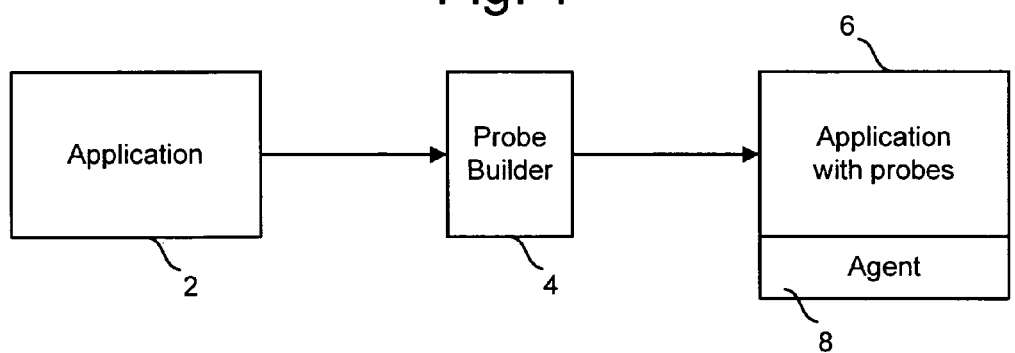
FIG. 1 is a block diagram describing how byte code for an application is instrumented.

FIG. 1 depicts an exemplar process for modifying an application's object code. FIG. 1 shows Application 2, Probe Builder 4, Application 6 and Agent 8. Application 6 includes probes, which will be discussed in more detail below. Application 2 is a Java application before the probes are added. In embodiments that use programming languages other than Java, Application 2 can be a different type of application. Probe Builder 4 modifies the byte code for Application 2 to add probes and additional code to Application 2 in order to create Application 6. The probes measure specific metrics about the application without changing the application's business logic. Probe Builder 4 also installs Agent 8 on the same machine as Application 6. Once the probes have been installed in the bytecode, the Java application is referred to as a managed application. In one embodiment, Probe Builder 4 operates automatically (e.g. without human assistance).

Figure 2:
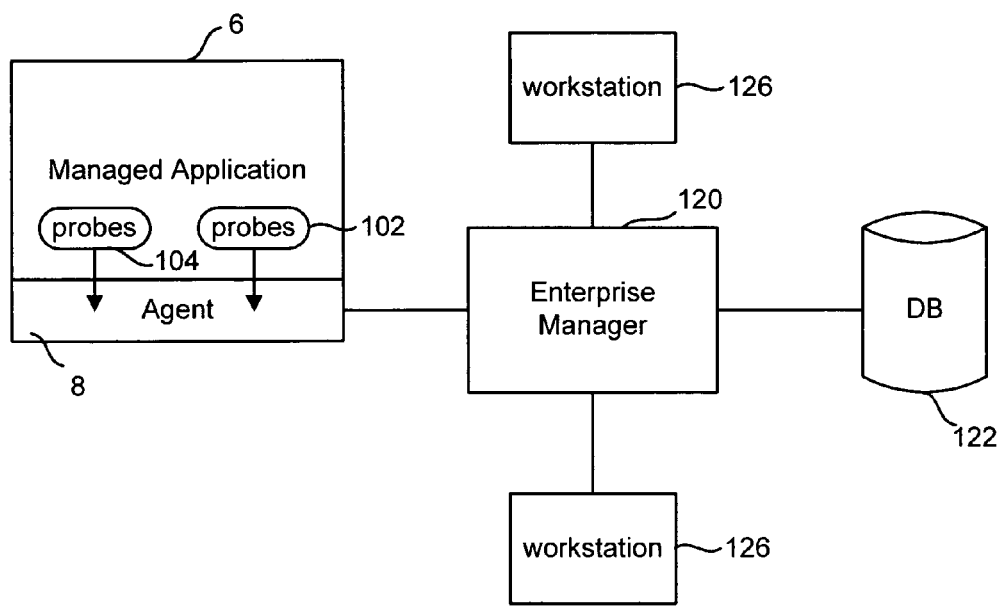
FIG. 2 is a block diagram of a system for monitoring an application. This system represents one example of a system that can implement the present invention.

FIG. 2 is a conceptual view of the components of one example of an application performance analysis tool that can implement one embodiment of the present invention. In addition to managed Application 6 with probes 102 and 104, FIG. 2 also depicts Enterprise Manager 120, data store 122, workstation 124 and workstation 126. As a managed application runs, probes (e.g. 102 and/or 104) relay data to Agent 8. Agent 8 then collects and summarizes the data, and sends the data to Enterprise Manager 120. Enterprise Manager 120 receives performance data from managed applications via Agent 8, runs requested calculations, makes performance data available to workstations (e.g. 124 and 126) and stores the data in data store 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way.

In one embodiment of the system, each of the components is running on different machines. That is, workstation 126 is on a first computing device, workstation 124 is on a second computing device, Enterprise Manager 120 is on a third computing device, managed Application 6 is running on a fourth computing device and Probe Builder 4 is running on a fifth computing device. In another embodiment, two or more of the components are operating on the same computing device. For example, managed application 6 and Agent 8 may be on a first computing device, Enterprise Manager 120 on a second computing device and a workstation on a third computing device. Alternatively, all of the components can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
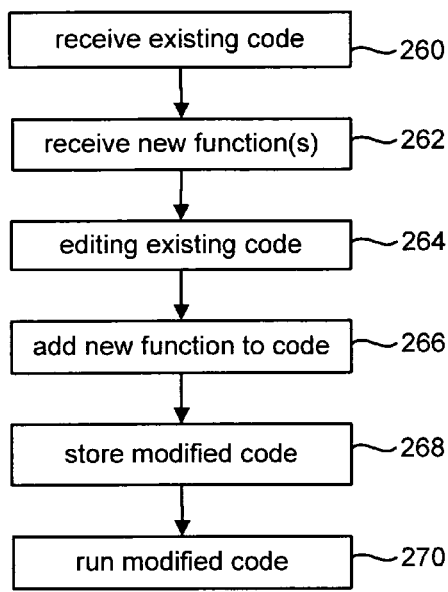
FIG. 3 is a flow chart describing one embodiment of a process for modifying existing code in order to use the system of FIG. 2.

FIG. 3 is a flowchart describing the process of modifying the existing object code in order to add new functionality to monitor an application. In step 260, Probe Builder 4 receives the existing object code. In step 262, Probe Builder 4 receives the new functionality, which can be new classes and methods that allow for monitoring the application. In some embodiments, the new classes and methods can be in the form of a library. In step 264, the existing code is edited. In step 266, all or part of the new functionality (e.g. the new classes/methods) is added to, combined with, or associated with the existing code. In step 268, the modified code (which includes the new functionality) is stored. In step 270, the modified code is run. In one embodiment, step 270 includes running the application as depicted in FIG. 2. In embodiments that use environments other than a performance analysis tool, step 270 includes executing in those other environments. The present invention is not limited to use with a performance analysis tool.

When running the modified code using the system of FIG. 2, it is anticipated that there can be multiple Agents each sending data for a large amount of metrics. For example, in one embodiment, each Agent may typically send data for 2,000 metrics every 7.5 seconds. Thus, a lot of data is being acquired. Consider, for example, a data sample that includes the following information: Agent name (4 bytes), metric name (4 bytes), start time (8 bytes), end time (8 bytes), minimum value (4 bytes), average value (4 bytes), maximum value (4 bytes), count (8 bytes).

The Agent name identifies the name of the Agent providing the data. The metric name identifies the metric being measured. In one embodiment, the Agent name and the metric name are represented by numbers, with a table identifying the correspondence between the numbers and Agent name/metric name. In many embodiments, a metric ID will be uniquely identified by a combination of Agent name and metric name. The start time indicates the start time of the period for which the data sample pertains to and the end time identifies the end of that period. In one embodiment, each Agent will send data for periods of 7.5 seconds (however, other periods can also be used). Thus, the end time may be 7.5 seconds after the start time. The minimum value is the minimum value measured for that metric during the period. The maximum value is the maximum value measured for the metric during the period. The average value is the average of all the values measured during the period. In some embodiments, the average value can be replaced by a mean value or another type of value other than average value. Count stores the total amount of values recorded for the metric during the period. Other embodiments can include less than the information described above or more information than described above. The above sample includes 44 bytes. If an Agent provides 2,000 samples every 7.5 seconds and a system utilizes many Agents, a lot of data needs to be stored.

Figure 4:
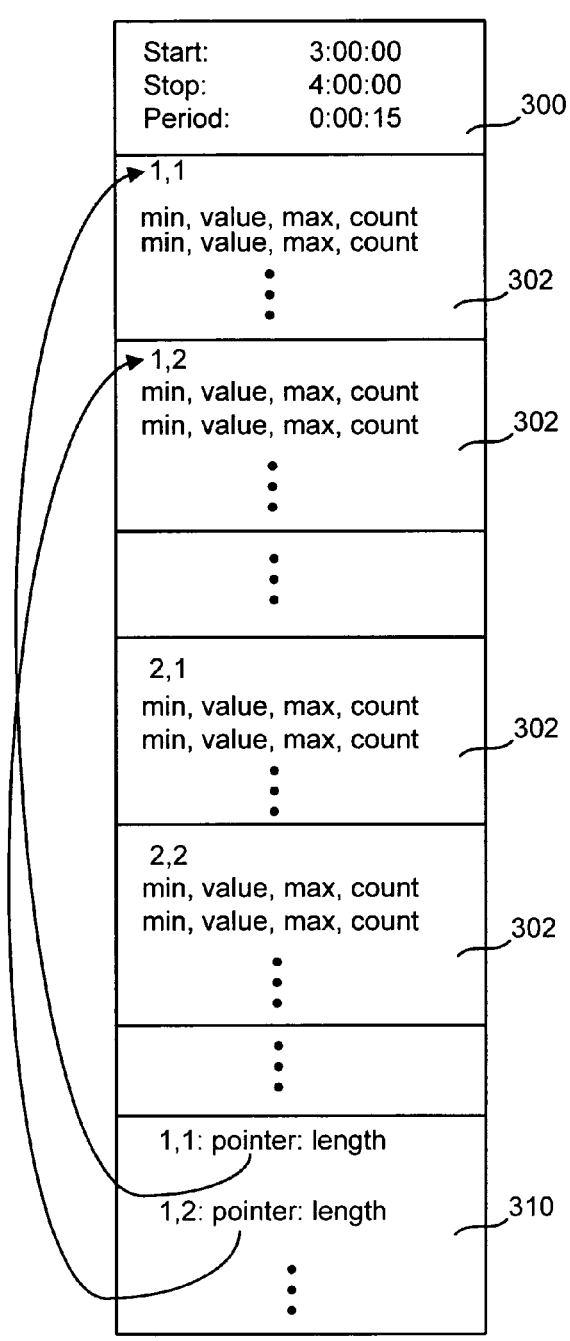
FIG. 4 is an example of a query format.

To reduce the burden of the storage system, a new data storage format is proposed. This new storage format is depicted in FIG. 4, and referred to as the query format. The data structure of FIG. 4 includes header 300, a set of blocks 302, and footer 310. The data structure of FIG. 4 stores data for a set of samples for multiple metrics during a period of time (e.g., one hour, one day, etc.). Note that for purposes of the data storage format of FIG. 4, an identification of the metric (e.g., 1,1), referred to as the metric ID, is a unique combination of both the Agent name and metric name. In header 300, the start time refers to the start time of the earliest sample and the stop time pertains to the end time of the latest sample. The period indicates the time between successful samples stored in the data structure. For example, FIG. 4 indicates a start time of 3:00 and an end time of 4:00:00 and an period of 15 seconds. Thus, the data structure in FIG. 4 includes an hours worth of data with a sample stored for every 15 seconds. In one embodiment, Agent 8 sends data every 7.5 seconds; therefore, Enterprise Manager 120 will combine two successive data samples from the Agent to create a sample for every 15 seconds. Because the header indicates the start and stop time in the period, that time data does not need to be stored with each sample of data because that information can then be implied based on the order of the samples. Thus, the amount of data stored for each sample has now been reduced because 16 bytes used to store the start and end time are no longer stored with each sample.

Each block of the data structure of FIG. 4 stores data for a particular metric over multiple samples. The term "block" applies to the data for a metric, and is not used to refer to the underlying physical storage device. Thus, the first item stored in each block is an identification of the metric, the metric ID. For example, the first block in FIG. 4 includes "1,1" which indicates that this is the metric for Agent 1, Metric 1. Within each block are a set of records. Each record stores Min, Value, Max, Count; which store information for the minimum value, the average value, the maximum value, and count for the particular period related to the sample. Additionally, because all the data sample records in the block are for the same metric, there is no need to store the Agent name and metric name with each record, which saves an additional 8 bytes per record. Thus, in FIG. 4, each record only includes 20 bytes, instead of 44 bytes. Note that each record within a block are stored in time order. Thus, the first record in a block pertains to the period starting 3:00:00 and ending at 3:00:15, the second record corresponds to the period starting at 3:00:15 and ending at 3:00:30, the third record corresponds to the period starting at 3:00:30 and ending at 3:00:45, etc. The blocks within the data structure are stored in metric ID order; therefore, the first block corresponds to metric 1,1, the second block corresponds to metric 1,2, etc.

Footer 310 includes a record for every block. Each record includes three fields. The first field identifies the metric (e.g., 1,1). The second field is a pointer to the start of the block corresponding to that metric. The third field indicates the length of the block corresponding to that metric. Thus, when searching through the data structure of FIG. 4, the search engine need only read the footer to find out where all the data is for a particular metric.

The data structure in FIG. 4 is significantly more compact than storing all the data exactly as received from the Agent. In addition, because all the data for a given metric is stored together and the footer provides a pointer to the start of the block, the data structure in FIG. 4 is easy to search.

Figure 5:
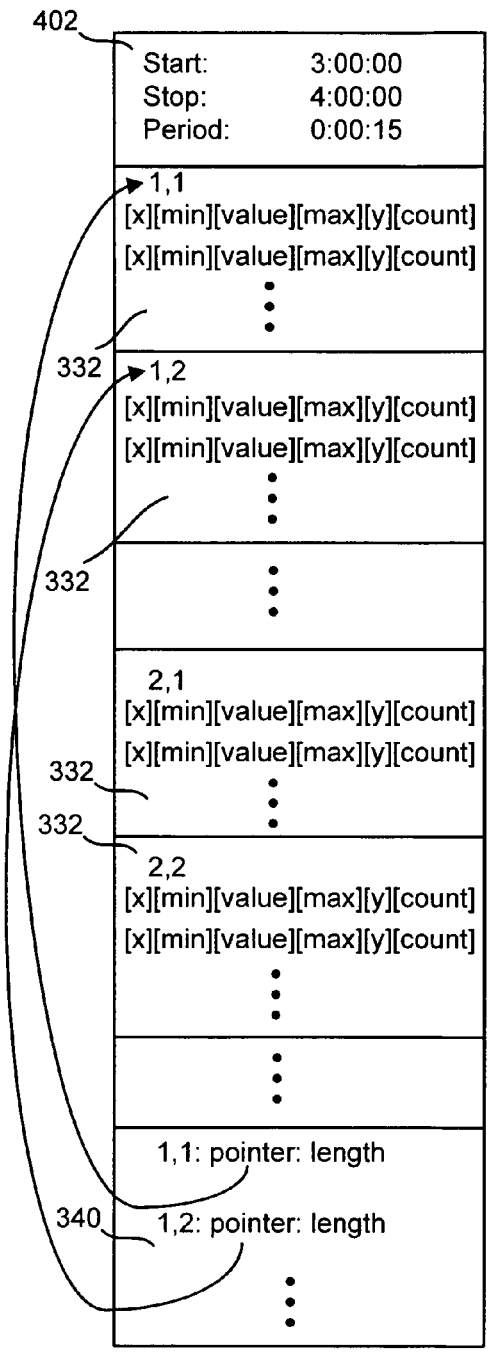
FIG. 5 is an example of a query format.

FIG. 5 provides another embodiment of the query data format. The query format of FIG. 5 includes a header 330 which is the same as the header 300 of FIG. 4. Additionally, the query format of FIG. 5 includes a footer 340, which is the same as the footer 310 in FIG. 4. The query format of FIG. 5 also includes a set of blocks 332, where each block includes all the data for a particular metric during the relevant time period. Each block includes identification of the metric (e.g., 1,1). Each block also includes a record for each period (e.g. 15 second period). For example, the records are listed as "[x] [min] [value] [max] [y] [count]." The main difference between FIG. 5 and FIG. 4 is that each record is compressed to save room. The compression can be performed using any suitable compression algorithm known in the art. In one embodiment, the compression is performed using a bit packing scheme and each record is compressed independently of other records.

It can be observed that the min, value, and max data do not necessarily each need 4 bytes. Additionally, the count data may not necessarily need 8 bytes. The system can determine how many bits are used for the largest of these variables and then reduce the amount of bits allocated to the data. For example, it may be that the min, value, and max variables only need 12 bits each, while the count variable may only need 9 bits. Thus, the system will try to reduce the number of bits used for each record. In the example of FIG. 5, the field [x] indicates the number of bits each that are used to store the min value, the average value, and the maximum value. The field [min] stores the minimum value for the period using only the number of bits identified by [x]. The field [value] stores the average value using only the number of bits indicated [x]. The field [max] stores the maximum value for the period using only the number of bit identified by [x]. The field [y] identifies the number of bits used to store the count. The field [count] stores the number of data samples within the period using only the number of bits identified by [y].

In one embodiment, [x] and [y] will always be 6 bits, thus, limiting the size of min, value, max and count. Other lengths can also be used. A reader of the file can read [x] to see how many bits will be used for min, value, and max and then know how much more bits to read to access those particular data. In the example above where min, value, and max need 12 bits each and count uses 9 bits, each record will only use (6+12+12+12+6+9) 57 bits, which is significantly less than the 160 bits used for each record in FIG. 4.

In one embodiment, the system may want to further compress the data in situations where an entire record is all zeros (e.g., zero values for min, value, max and count). In one embodiment, in front of each record will be one bit to identify whether there is data for that record. If that one bit is a one, then there will be a record of data. If that first bit is a zero, then no record would follow because the data is all zeros.

In another embodiment, the data can be further compressed by not using an [x] field and a [y] field for each record. Instead, there will be one [x] field and one [y] field for twenty records. The values for the [x] field and the [y] field will apply to all of the associated twenty records.

In other embodiments, compression schemes other than bit packing can be used, such as delta/difference encoding and other suitable compression schemes known in the art.

In another embodiment, the footer can store summary data of all the data within a particular query file, including the min, max, average and count for the entire query file. In some implementations, an average value for each metric can be stored in the footer. This allows for very efficient iceberg queries (e.g., find top N metrics). In another embodiment, a query file can be compressed by removing all the data that is below a threshold.

While the query file format of FIG. 5 is significantly more compact than the generic format, and is quick to query, it may take a longer time than available to write the format of FIG. 5. That is because the data comes in from for all metrics after each time period. When performed in real time, there is not likely to be enough time to separate the data by metric and create the blocks of FIG. 5. Thus, in one embodiment, the system will first write the data received from the Agents into a format that is faster to write. This format is called the spool format and is depicted in FIG. 6.

Figure 6:
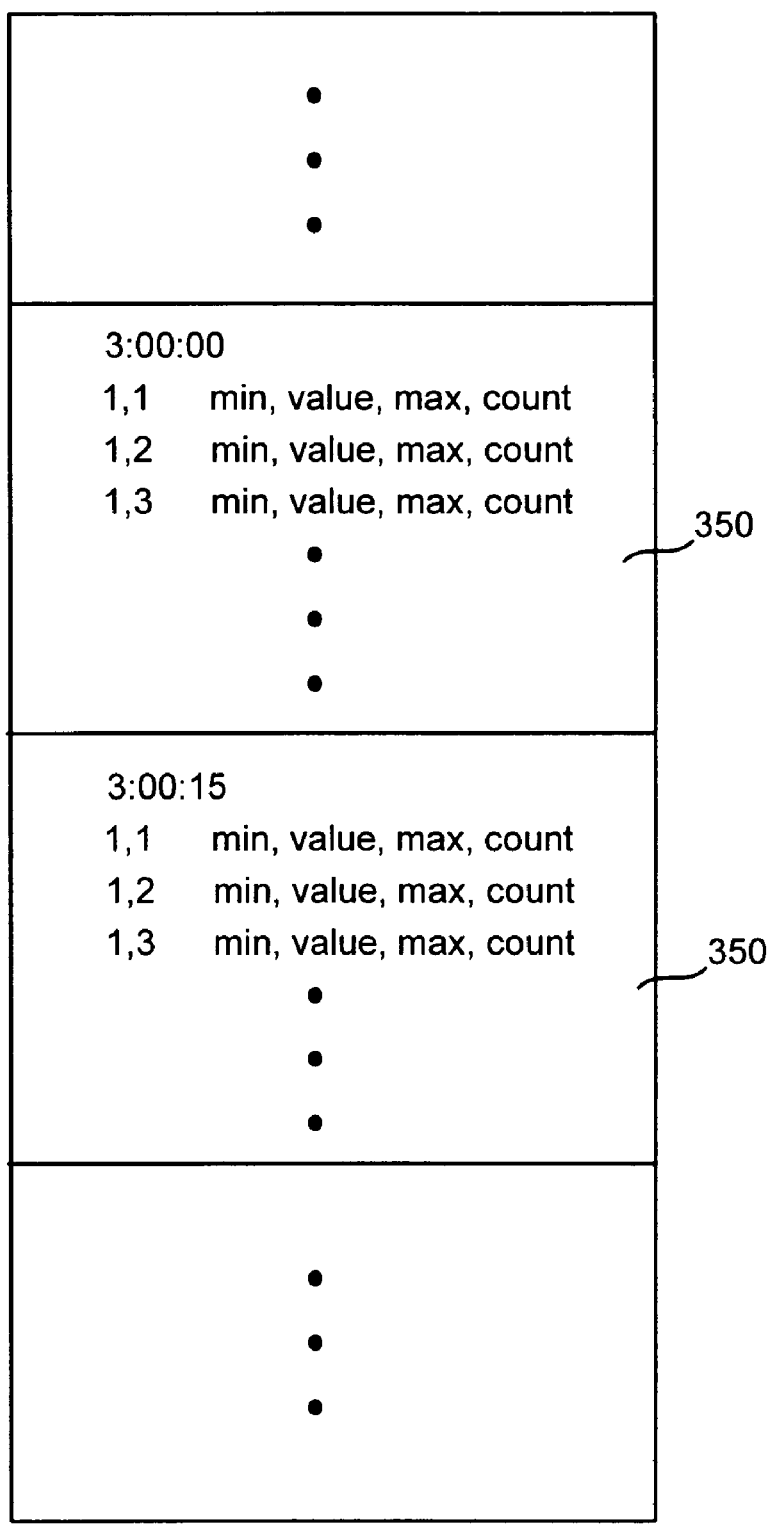
FIG. 6 is an example of a spool format.

The spool format of FIG. 6 includes a series of blocks 350, where each block includes all the data received during a time period for all metrics measured during that time period. In one example, the Agents are sending data to the Enterprise Manager every 7.5 seconds, and at every 15 seconds Enterprise Manager 120 accesses the data and combines the last two samples received. In that case, the Enterprise Manager 120 stores data for 15 second intervals/periods. There will be a block 350 in the file format of FIG. 6 for every 15 second interval/period. At the beginning of each block, there is an indication of the start time for the interval/period. Each record in the block will identify the metric associated with the data for that record. In addition, each record stores the min, the value, the max and the count. Thus, each record will store 28 bytes worth of data.

In one embodiment, the data in FIG. 6 will not be compressed. Thus, the data structure in FIG. 6 is quick and easy to write. Comparing the data structure in FIG. 6 to the data structure in FIG. 5, the data structure of FIG. 6 is organized to accommodate fast writing while the data structure in FIG. 5 is organized to accommodate fast queries and compact storage. Additionally, the data structure in FIG. 6 groups together data that was measured at the same time, while the data structure of FIG. 5 groups together data that is for the same metric.

Figure 7:
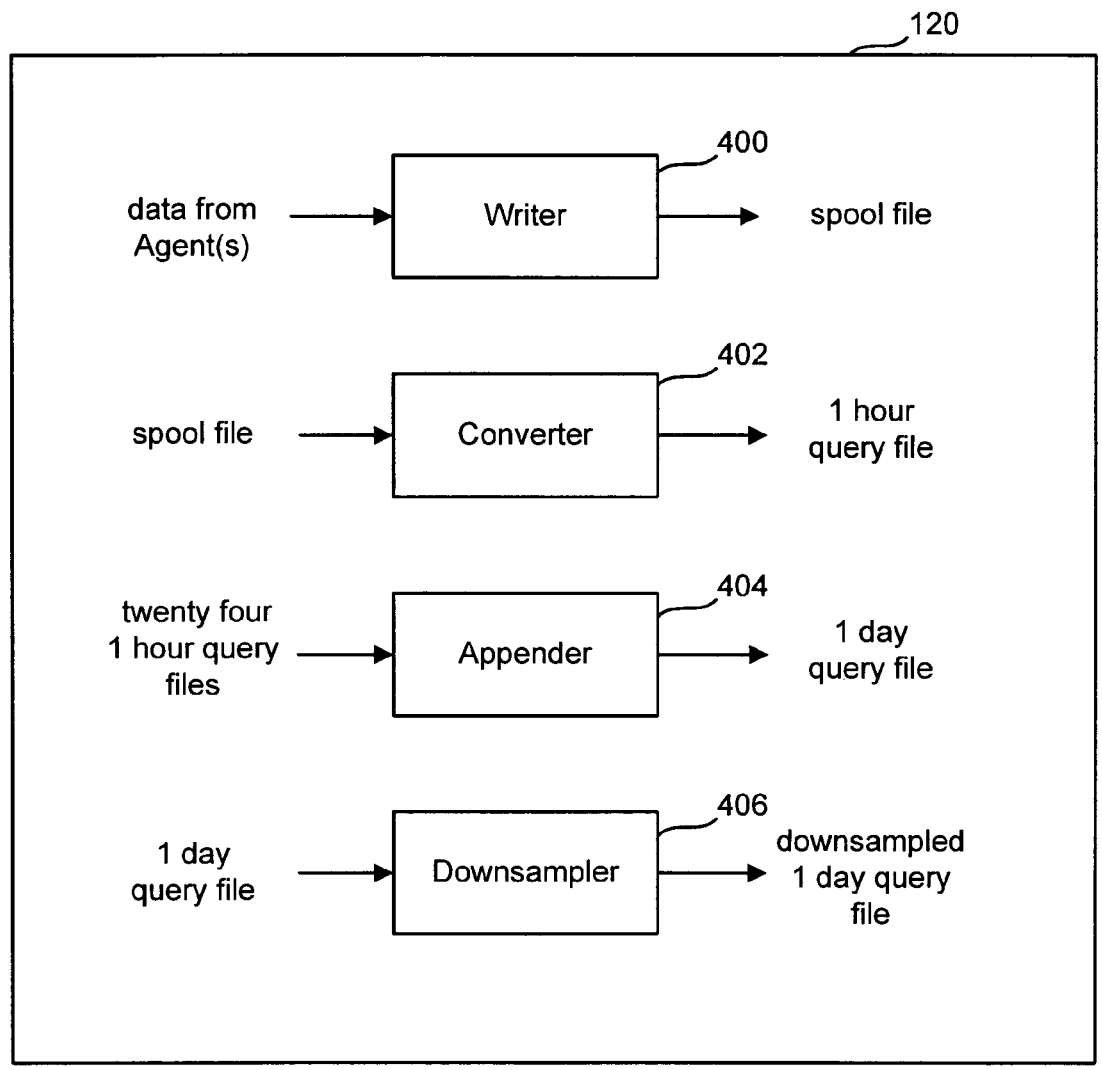
FIG. 7 is a block diagram of one embodiment of some of the components inside the Enterprise Manager.

FIG. 7 provides a block diagram depicting some of the components of Enterprise Manager 120 that operate on the data structures of FIGS. 5 and 6. FIG. 7 depicts writer 400, converter 402, appender 404, and down sampler 406. Writer 400 receives the data every 7.5 seconds from the various Agents and writes one or more spool files with that data. Writer 400 writes a block of data every 15 seconds. Converter 402 will convert a spool file for one hour of data to a one-hour query file. That is, converter 402 converts a file in a format depicted in FIG. 6 to a file in the format depicted in FIG. 5, for one hour's worth of data. For example, FIG. 5 shows a start time at 3:00:00 and stop time of 4:00:00, indicating one hour of data with records for 15 second periods. Appender 404 will receive 24 of the one-hour query files as an input and combine then to create one larger query file for an entire day. Enterprise Manager 120 will also include down sampler 406, which will receive a one-day query file as an input and down sample that data to create a smaller sized one-day query file. For example, if the input data file has records for every 15 second, the down sampled query file will include records for every minute, every 10 minutes, every 30 minutes, every hour, or other interval. Down sampler 406 can also operate on other query files in addition to the one-day query file. Each of these components will be discussed in more detail below.

Figure 8:
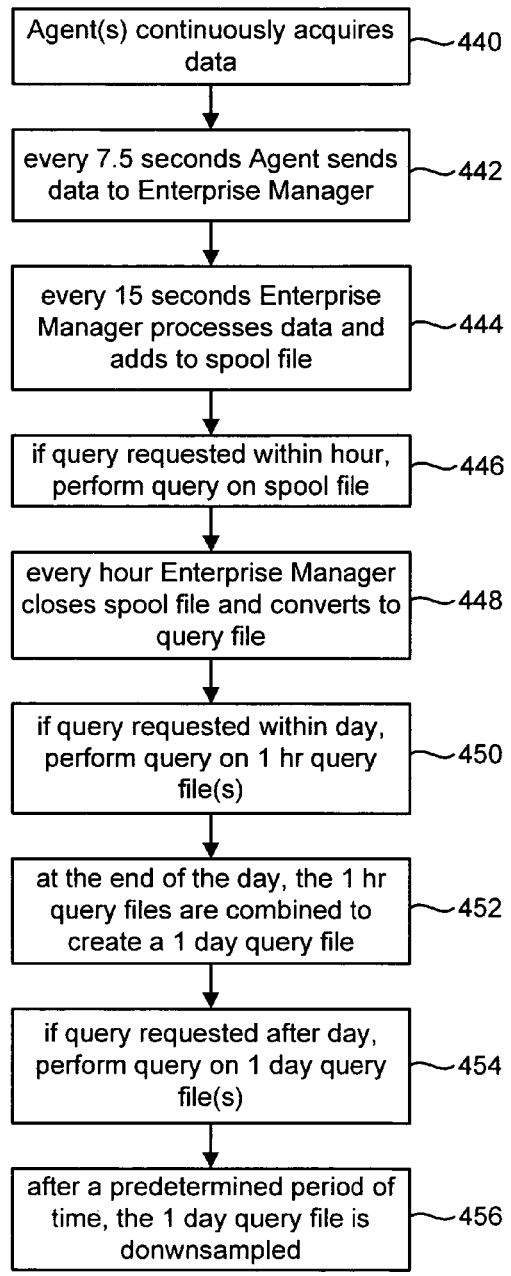
FIG. 8 is a flow chart describing one embodiment of a process for operating the system of FIG. 2.

FIG. 8 provides a flowchart describing one embodiment of a method for processing data received from the Agent including the creation of the various data files discussed above. In step 440, one or more Agents will continuously acquire data for the metrics that they are monitoring. Step 440 will be performed continuously in parallel to the other steps of FIG. 8. Every 7.5 seconds, the Agents will send the data they have acquired to Enterprise Manager 120 (step 442). Every 15 seconds, Enterprise Manager 120 wakes up and processes the data received from the Agents and adds that data to a spool file (step 444). In one embodiment, when Agents are sending data every 7.5 seconds, then two sets of data will be processed every time step 444 is performed. Enterprise Manager 120 will continue appending data to a spool file for up to an hour. If, during that hour, a query is received in regard to the data in the spool file, that query will be performed on the spool file as discussed below (step 446). Every hour, Enterprise Manager 120 will close the spool file and convert that spool file to a one-hour query file (step 448). At that point, the Enterprise Manager 120 will open up a new spool file and new data received from the Agents will be stored into the new spool file. If, during the day that data was received, a query is received for the data of that day, then a query will be performed on the appropriate one or more one-hour query files as described below (step 450). At the end of the day, all the one-hour query files for that day are combined to create a one-day query file (step 452).

In one embodiment, step 452 is performed at or around midnight each day. If a query is requested for data after the date that the data was acquired, then that query will be performed on the appropriate one or more one-day query files (step 454). After a predetermined period of time, the one-day query files are down sampled as discussed below (step 456). Performance of the queries mentioned above may include searching for data and presenting the results of the searches to a user, file, process, device, etc.

Figure 9:
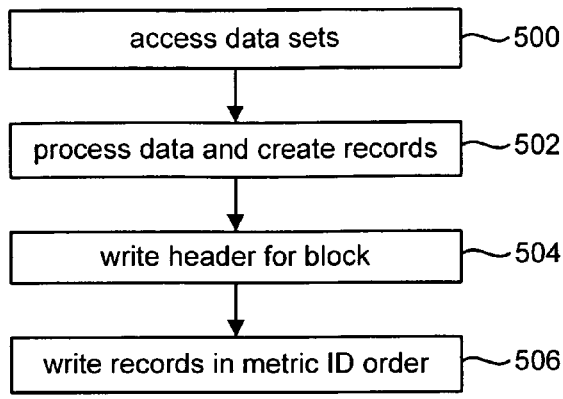
FIG. 9 is a flow chart describing one embodiment of a process for writing to a spool file.

FIG. 9 includes a flowchart describing one embodiment of a process of creating a spool file (see step 444 of FIG. 8). In step 500, Enterprise Manager 120 accesses the data sets received from the Agents since the last time the process of FIG. 9 was performed. In one embodiment, the process of FIG. 9 is performed every 15 seconds. In other embodiments, FIG. 9 can be performed at different intervals. In step 502, Enterprise Manager 102 will process the data and create the various records for the data accessed in step 500. As explained above, in one embodiment, when two data sets are received from the Agents, these data sets will be combined in step 502. Each of the data sets will include a min value. The lowest min value will be the new min value. The highest max value will be the new max value. Enterprise Manager 102 will add the count values for both data sets to create a new count value. In addition, using the count values, a weighted average will be created from the two average values received from the Agents. As described above, each block in a spool file includes a header for that block indicating the begin time for the period associated with the block. In step 504, that header indicating the start of the period is written. In step 506, each of the records created in the step 502 are written to the block. These records are written in metric ID order (e.g., 1,1; followed by 1,2; followed by 1,3; . . . ). At the end of an hour, the spool file is closed, as described above.

Figure 10:
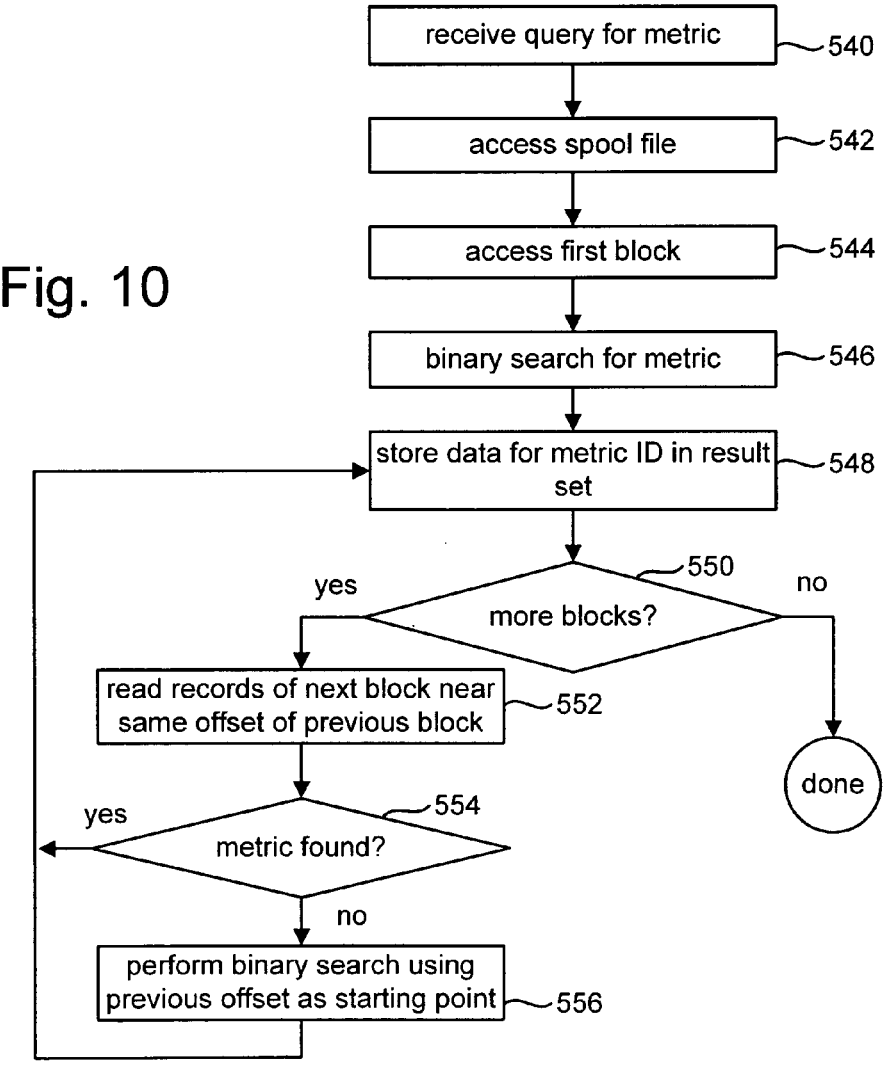
FIG. 10 is a flow chart describing one embodiment of a process for performing a query on a spool file.

FIG. 10 provides a flowchart describing one embodiment process for querying a spool file (e.g., step 446 of FIG. 8). In step 540, Enterprise Manager 120 will receive a request to perform query for a particular one or more metrics that are in a spool file. In step 542, Enterprise Manager 102 will access the appropriate spool file. In step 544, Enterprise Manager 102 will access the first block of the spool file. For example, a user may request all data for a particular metric. Thus, Enterprise Manager will need to read the data for that metric from each block stored in the spool file. Step 544 includes accessing the first block. In step 546, Enterprise Manager 102 will perform a binary search for that metric within that first block.

A binary search algorithm searches a sorted array by repeatedly dividing the search interval in half. First, the search algorithm begins with the interval covering the entire array. If the value of the search key is less than the item in the middle of the interval, then the interval is narrowed to the lower half of the array. If the value of the search key is greater than the item in the middle of the interval, then the interval is narrowed to the upper half. The binary search item is then called recursively for the newly limited interval until the target is found.

In step 546, Enterprise Manager 102 will perform a binary search for the metric ID in the first block. In step 548, the data found by the binary search (e.g., the data associated with the metric ID) is stored in a result set. In step 550, it is determined whether there are any more blocks to search. If there are no more blocks to search, then the process of FIG. 10 is completed and the result set is returned.

If there are more blocks to search (step 550), then in step 552, Enterprise Manager 120 will read a set of records from the next block near the same offset identified for the previous block. For example, if there are 2,000 records in a block and in the first block a binary search identified the metric of interest as record number 600, then in step 552 Enterprise Manager 120 will look at record 600 of the next block. Additionally, Enterprise Manager 120 will look at a set of records before and after record 600. For example, in one embodiment, five records on each side will be reviewed. In other embodiments, ten records on each side can be reviewed. The window of review can differ by implementation. If the metric being queried is found in that window (see step 554), then the method continues at step 548 and stores data for that metric in the result set. If the metric was not found in that window (step 554), then Enterprise Manager 102 will perform a binary search on the current block being searched. When the binary search is performed in step 556 rather than initially testing whether the metric is below or above the middle of the block, the process will test whether the metric is above or below the offset identified for the previous block. After that, the binary search will perform as usual. After identifying the appropriate record for the metric in step 556, that data for that metric is stored in step 548 and the process continues in step 550. As can be seen, storing the data within a block in metric ID order improves performance during queries.

Figure 11:
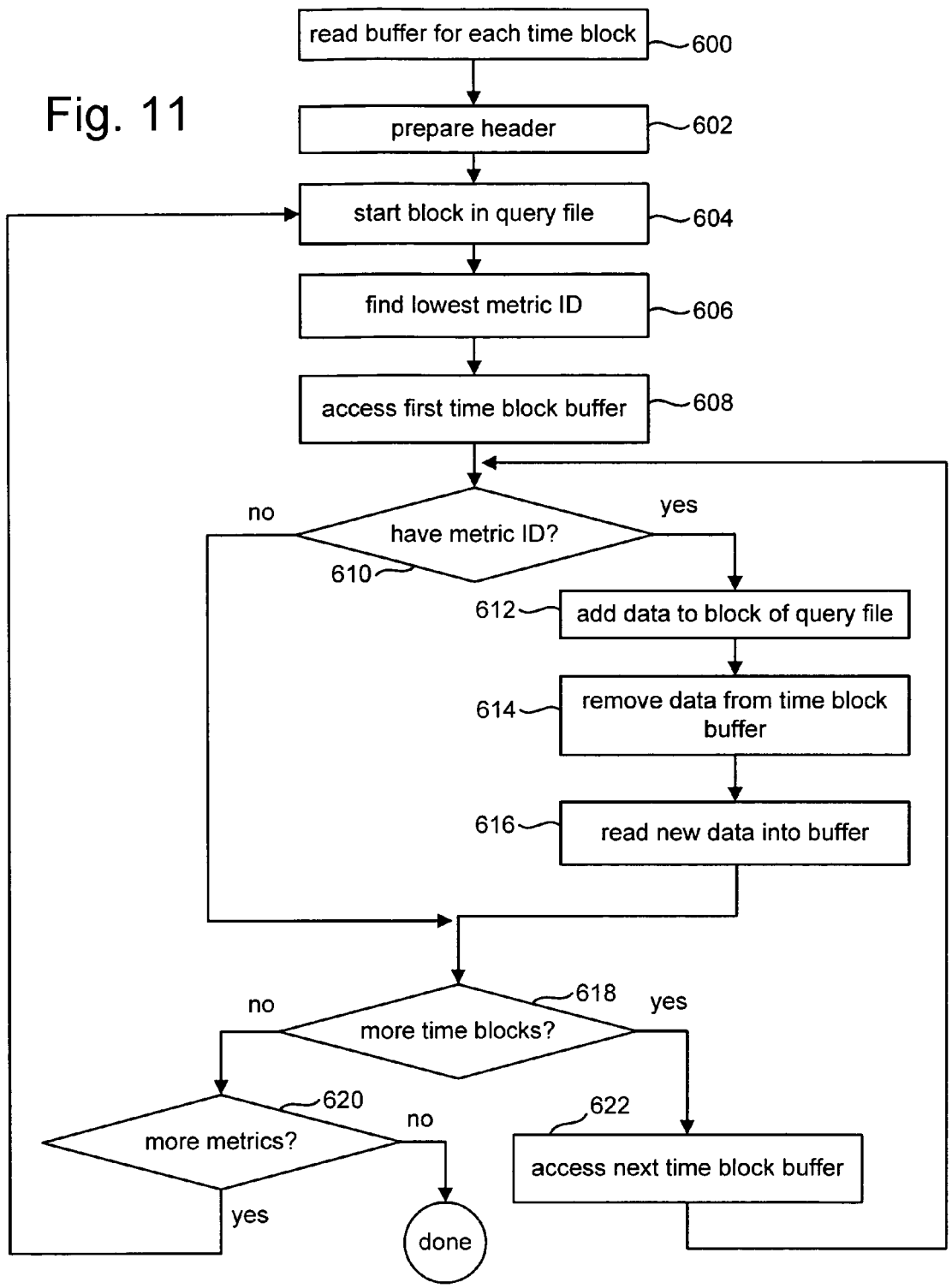
FIG. 11 is a flow chart describing one embodiment of a process for converting a spool file to a query file.

FIG. 11 provides a flowchart describing one embodiment of a process for creating a one-hour query file (step 448 of FIG. 8). In step 600, Enterprise Manager 102 will read a buffer for each time block 350 of the spool file. In one embodiment, each buffer will be a 20K sliding window. The first time the buffers are read, these sliding windows will include the header field of each block that includes the start time of the block. In step 602, header 330 of the query file is prepared by looking at the start times of each of the blocks. Based on the start times, Enterprise Manager 120 can determine the start and stop times, as well as the period. In step 604, a new block 332 is started in the query file. In step 606, Enterprise Manager 102 will find the lowest metric ID in all of the buffers. In step 608, the first time block buffer of the spool file will be accessed and in step 610, Enterprise Manager 120 will determine whether that block includes data for the current lowest metric ID. This is done by determining whether the metric ID (e.g., 1,1) is in the block. If not, the process skips to step 618. If the block does have the metric ID, then in step 612 the record for that metric ID is added to the block of the query file. In step 614, the data for that metric ID is removed from the buffer of the appropriate time block. In step 616, a new data value is read from the spool file into the buffer of the time block under consideration (The buffer is a sliding window). In step 618, it is determined whether there are more time blocks in the spool file to consider. If yes, then in step 622, the next time block is accessed and in step 610, it is determined whether the buffer for that time block includes the current lowest metric ID. If all the time blocks have been considered for the particular metric ID under consideration (step 618), then it is determined whether there are more metric IDs to consider. For example, Enterprise Manager 120 determines whether there are more metric IDs in any of the buffers for any of the time blocks. If there are no more metrics to consider, then the process of FIG. 11 is completed. If there are more metrics to consider, then the process loops back to step 604, a new block in the query file is created and then the lowest metric ID is identified in step 606. The process continues as described above. In one embodiment, the process of FIG. 11 reduces the number of seeks performed when reading a set of relevant data and insures that most reads from disk are of significant length.

Figure 12:
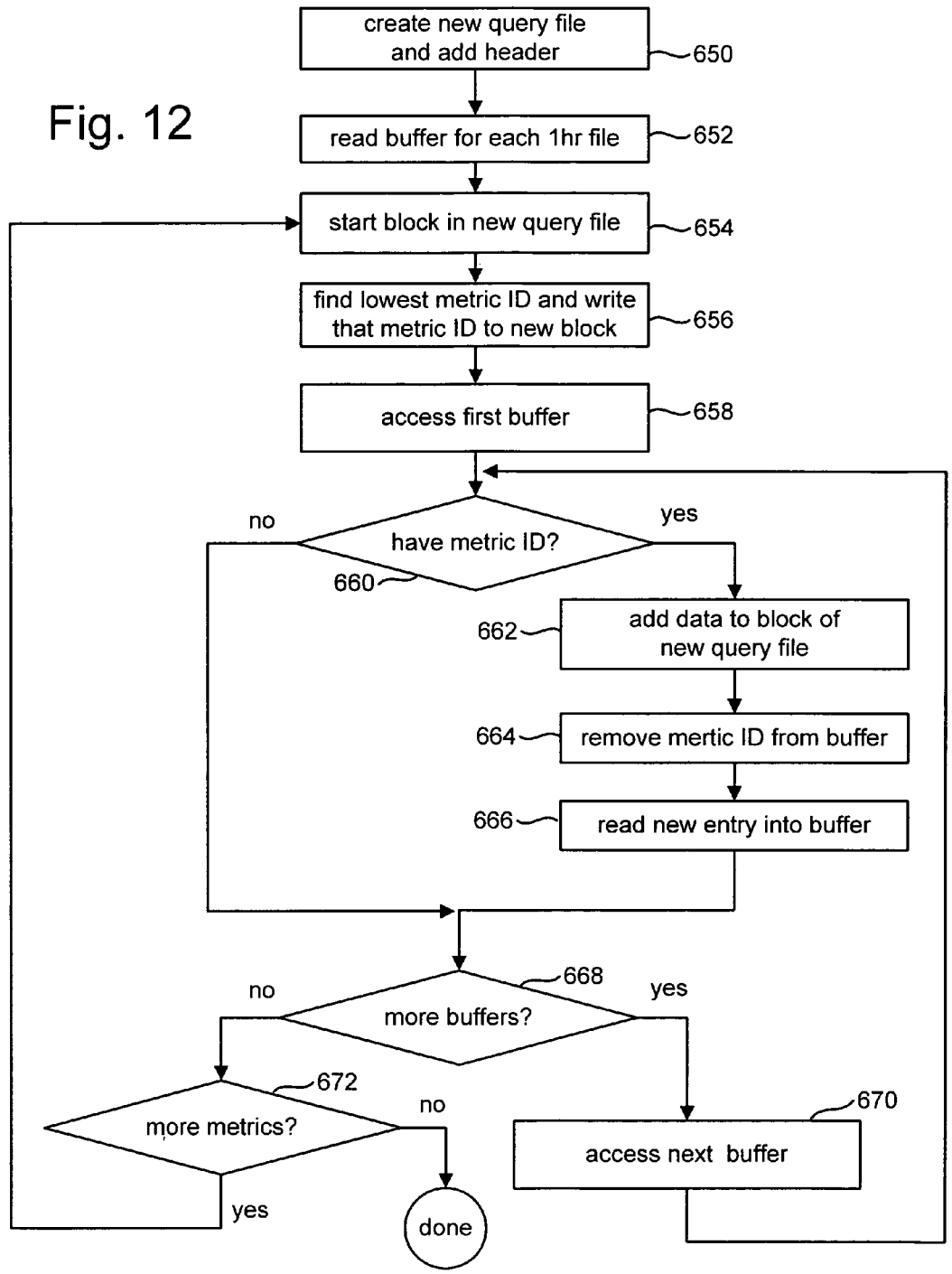
FIG. 12 is a flow chart describing one embodiment of a process for appending a set of query files.

FIG. 12 is a flowchart describing one embodiment of process for converting 24 one-hour query files to a one-day query file (e.g., step 452 of FIG. 8). In step 650, Enterprise Manager 120 creates the new one-day query file. Additionally, Enterprise Manager 102 will read the headers of all the one-day query files to determine the start, stop, and period for the header of the newly created one-day query file. In step 652, Enterprise Manager 120 will read in a buffer for each of the one-hour query files. Each buffer will include 100 entries from the footer of the appropriate one-hour query files. These buffers will be sliding windows of data from each of the footers. The use of sliding windows reduces memory usage. In step 654, a new block will be created in the new 24-hour query file. In step 656, Enterprise Manager 102 will identify the lowest metric ID in the buffers. That metric ID will then be written into the new block. In step 658, the first buffer (e.g., the buffer associated with the one-hour query file of the earliest time) will be accessed. In step 660, it will be determined whether that buffer includes the metric ID under consideration. If not, the process continues in Step 668. If that buffer does include the metric ID, then the associated one-hour query file includes data for that metric ID. In step 662, the block of data associated with metric ID under consideration is added to the new query file. In one embodiment, step 662 can be performed using a direct file-to-file transfer which is performed by the operating system. In step 664, the metric ID is removed from the buffer under consideration. In step 666, a new entry is read from the appropriate one-hour query file into the buffer (the buffer is a sliding window). In step 668, it is determined whether there are any more buffers to consider. If there are more buffers to consider, then the next buffer is accessed in step 670 and the process continues at step 660 to determine whether that buffer includes the metric ID under consideration. When all the buffers have been searched for the particular metric ID under consideration (step 668), then the process continues at step 672, at which time Enterprise Manager 120 determines whether there are any more metrics to consider. In one embodiment, step 672 includes determining whether any of the buffers include any more data. If not, the process is done. If there is more data in any of the buffers, then the process continues at step 664, at which time a new block is created in the new one-day query file and then the lowest metric is identified in step 656. The process will continue as described above.

In one embodiment, Enterprise Manager 120 will create and store the spool file on a disk drive (or other data storage device/system) local to the Enterprise Manager. Additionally, Enterprise Manager 102 will create and store the various query files in the disk drive (or other data storage device/system) local to the Enterprise Manager. In another embodiment, Enterprise Manager 120 can store the spool and query files in a data storage system external to Enterprise Manager 120.

Figure 13:
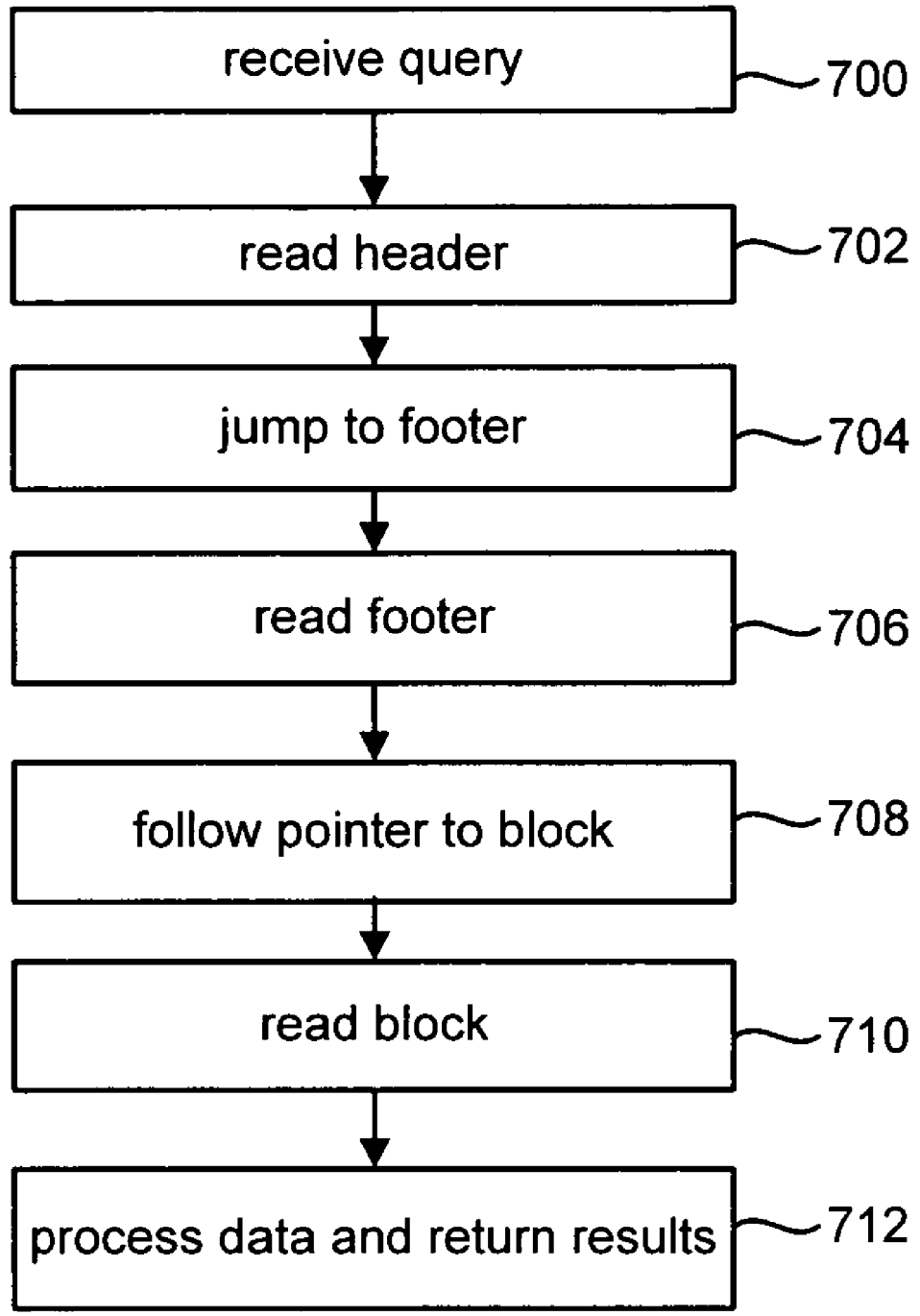
FIG. 13 is a flow chart describing one embodiment of a process for performing a query on a query file.

FIG. 13 is a flowchart describing one embodiment for performing a query on either a one-day query file, a one-hour query file or a query file of another resolution (see steps 450 and/or 454 in FIG. 8). In step 700, a query is received to identify information about a particular metric. In step 702, Enterprise Manager 102 will read the header of the appropriate query file. Depending on the query, Enterprise Manager 102 may need to access one or more one-hour query files and/or one or more one-day query files. The header of the query files will help Enterprise Manager 120 determine whether the query file is likely to have the desired data. In step 704, Enterprise Manager 120 will jump to the footer of the query file. In step 706, Enterprise Manager 120 will read the various records in the footer of the query file, looking for the metric ID associated with the query. When Enterprise Manager 120 finds the metric ID in the footer, Enterprise Manager 120 will follow the pointer associated with that metric ID to the appropriate block. In step 710, the appropriate block will be read. Step 710 includes reading the various records of the block and, possibly, decompressing the records. In step 712, the data is processed based on the query and the results are returned to the entity seeking the data. One embodiment of step 712 includes decompressing the data. Other embodiments can include combining the data or identifying the particular substantive data requested by the query.

Figure 14:
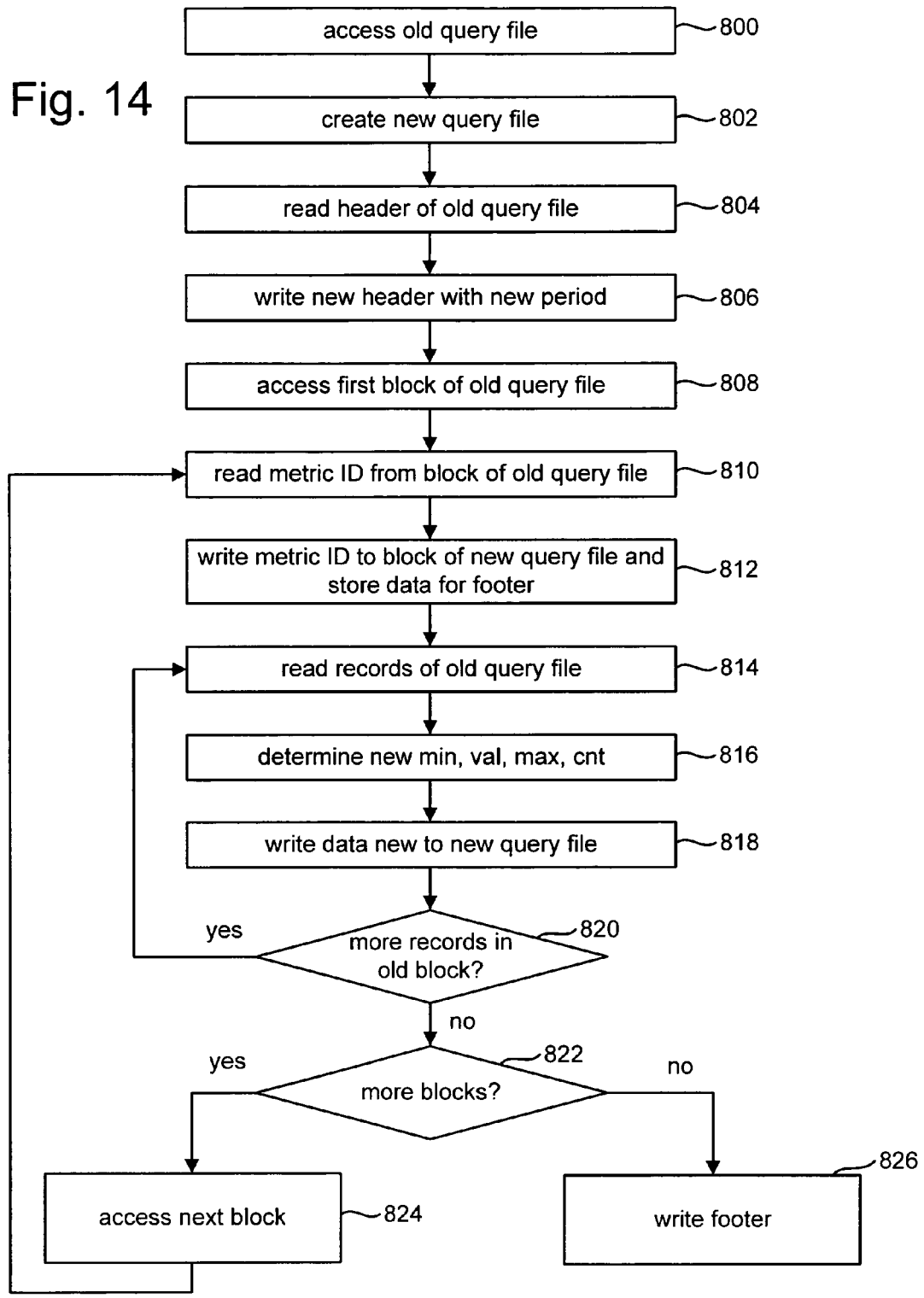
FIG. 14 is a flow chart describing one embodiment of a process for down sampling a query file.

FIG. 14 divides a flowchart describing one embodiment of a process for down sampling a one-day query file (see step 456 at FIG. 8). In other embodiments, the process in FIG. 14 can also be performed on one-hour query files or other query files of other resolutions. In step 800, the old query file that is to be downsized is accessed. In step 802, a new query file is created. In step 804, Enterprise Manager 102 will read the header of the old query file. In step 806, Enterprise Manager 120 writes the new header for the new query file. This new header includes the same start and stop times, however, the period will be different. For example, if the down sampling will be compressing the data from 15 second samples to one minute samples, the period will be changed from 15 seconds to one minute. In step 108, Enterprise Manager 102 will access the first block of the old query file. In step 810, Enterprise Manager 102 will read the metric ID from the block of the old query file under consideration. In step 812, that metric ID will be written to the top of the new block of the new query file. Additionally, data (e.g., metric ID and address) will be stored for later use in the footer. In step 814, a number of records in the old query file are read. The number of records read in step 814 depends on the down sampling rate. For example, if four records are being compressed to one record, then four records are read in 814. For example, in an embodiment where the 15 second query file is being down sampled to a one-minute query file, then four records need to be read. If the down sampling is converting a 15 second query file to a one-hour query file, then 240 records are read.

In step 816, new min values, new max values, new average values, and new counts are determined. The new min value is the lowest value of all the min values read in step 814. The new max value is the maximum value for all the max values read in step 814. The new count is the sum of all the counts read in step 814. The new average value is a weighted average of all the average values read in step 814. In step 818, the new record is written to the new query file. In step 820, it is determined whether there are more records in the block under consideration that need to be processed. If so, the method continues at step 814 and processes those additional records. If all the records in the block have been processed, then in step 822 it is determined whether there are any more blocks in the old query file to process. If there are more blocks to process in the old query file, then the method continues at step 824 and accesses the next block. The method then continues at step 810 and processes the next block in steps 810-822. If, in step 822, it is determined that there are no more blocks to process, then the footer is written in step 826. The footer will include the metric IDs, pointers to the blocks and lengths for each of the blocks. The footer information can be stored in memory as the various blocks are written to the new query file. Note that FIG. 14 provides one embodiment for down sampling. Other methods for down sampling or otherwise compressing the data can also be used. The present technology is not restricted to any one particular down sampling or compression method.

In some embodiments of the down sampling, the system can utilize an aging policy where a particular query file is down sampled multiple times at various periods. For example, after a week a 15 second file may be down sampled to one minute, after a month the one-minute file can be down sampled to 30 minute samples, and after another year the data may be deleted. Other values can also be used.

As explained above, the Agent name and metric name can be represented as numbers. In one embodiment, Enterprise Manager 120 will keep a hash table to store the correspondence of numbers to Agent names. A second hash table can be used to store correspondence between metric names and numbers. In some embodiments, the number for the Agent name and the number for the metric name can be 32 bit values. In many embodiments, the number for the Agent name and the number for the metric name are combined to form a 64 bit value. In some embodiments, there will be one hash table to store correspondence between the combination of Agent names/metric name to 64 bit (or other size) ID numbers.

In one embodiment, Enterprise Manager 120 will keep a map of which Agents acquire data for which metrics. This may enable the Enterprise Manager 120 to report data more efficiently. In one embodiment, at the time of rebooting, Enterprise Manager 120 can read all the query files to see what Agents provided data for which metrics. This can be done simply by reading the footers of query files. To store this information, each metric will have a bit set. Each bit in the bit set corresponds to an Agent. For example, if there are 200 Agents, a bit set for a metric will have 200 bits with the first bit corresponding to Agent 0, the second bit corresponding to Agent 1, the third bit corresponding to Agent 2, etc. If a particular Agent acquires data for that metric, the bit in the bit set will be one. If the Agent does not acquire data for that metric, the bit in the bit set corresponding to the Agent for that metric will be zero. If two metrics have the same Agents acquiring data for those metrics, then instead of having two bit sets, the metrics can share a bit set. That is, the metrics can point to the same bit set. The system can used "copy-on-write" to ensure that sharing has no unwanted side effects.

In one embodiment, if an Agent or metric does not provide data to Enterprise Manager 120 for a pre-defined period of time, then the Agent ID or metric number is reclaimed.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for processing data, comprising:
receiving time series measurement data about a plurality of application metrics over a plurality of time periods, wherein each application metric measures the performance of a component of a software application;
writing said received time series measurement data to a first file in a spool format, the first file having blocks of data each including a header indicating a begin time for the time period associated with the block of data and storing all time series measurement data received within the time period associated with the block of data, said writing includes writing to the first file during a first time period; and
converting the first file into a second file having a header and blocks of data containing said time series measurement data in a second format suited for compact storage, wherein each block of data stores only time series measurement data for a single application metric, the header indicating the time period between each instance of time series measurement data stored in the block of data, said converting includes writing to a second file after said first time period;
receiving a first query of said time series measurement data during said first time period;
performing said first query of said time series measurement data using said first file during said first time period;
receiving a second query of said time series measurement data after said first time period; and
performing said second query of said time series measurement data in said second file, said second file has a footer, said footer includes pointers to each block of data; said performing said second query includes reading said footer to identify the block of data containing the time series measurement data associated with the metric, following a pointer to a corresponding block of data associated with the metric, reading the corresponding block of data and reporting based on information in said corresponding block.

2. A method according to claim 1, wherein:
said spool format stores data in blocks such that each block is associated with a different time period.

3. A method according to claim 2, wherein:
each block of data in the second file stores a set of records associated with each time series measurement data, each record corresponding to different time periods; and
each record is compressed individually.

4. A method according to claim 1, wherein:
said steps of receiving, writing and converting are performed by application performance analysis software.

5. A method according to claim 4, wherein said application performance analysis software further performs the step of:
adding probes and an Agent to a software application, said Agent receives data from said probes, said time series management data is received from said Agent.

6. A method according to claim 1, wherein:
said writing includes creating a set of files in said spool format;
said converting includes creating a set of files in said second format, each of said set of files in said second format corresponds to a different time period; and
said method further comprises aggregating said set of files in said second format and down sampling said set of files.

7. A method according to claim 6, wherein:
said receiving and writing are performed continuously;
said converting is performed every hour;
said aggregating is performed each day; and
said down sampling is performed after a week.

8. A method for processing data, comprising:
receiving time series data associated with a plurality of metrics;
writing said time series data to a first file in a spool format during a first time period, wherein the time series data is organized in the first file into blocks of data, each block of data storing time series data received during a sample period of a plurality of sample periods, said spool format includes a set of blocks of information, each block of information stores a time sample for a set of metrics;
converting said time series data from said spool format in the first file to a second format in a second file suited for long term storage after said first time period, said second format includes a header and a footer, wherein the time series data is organized in the second file into blocks of data, each block of data storing time series data for a single metric received over the plurality of sample periods including records that are individually compressed, the footer containing a record for each block of data identifying the metric associated with the block of data and a pointer indicting the start of the block of data corresponding to the metric, the footer includes pointers to each block of data;
receiving a query of said time series data associated with a particular metric after said first time period; and
performing said query of said time series data after said first time period by searching the footer of the second file for the particular metric and following a pointer associated with the particular metric to the block of data containing said time series data in said second format associated with the particular metric.

9. One or more processor readable storage devices storing processor readable code for programming one or more processors, said processor readable code comprising:
a writer, said writer receives data about a set of metrics associated with a software application and stores said data in blocks of data in a first file in a first format during a first time period, each block of data contains a beginning sample time and all data acquired from the beginning sample time through a sample period, wherein each instance of data stored in a block of data is associated with a metric;
a converter, said converter accesses said data in said first format and converts said data from said first format to a second format in a second file having a header and blocks of data after the first time period, the header includes a start time indicating the earliest sample time associated with the data stored in the blocks of data, a stop time indicating the latest sample time associated with the data stored in the blocks of data and a sample period for each instance of data stored in a block of data based on the beginning sample times contained in the blocks of data in the first format, each block of data stores all data about a single metric acquired between the start sample time and the stop sample time indicated in the header, said second file has a footer that includes pointers to each block of data; and
a manager that receives a first query of said data during said first time period, performs said first query using said first file during said first time period, receives a second query of said data after said first time period, and performs said second query of said data in said second file, said performing said second query includes reading said footer to identify the block of data containing the data associated with the metric and following a pointer to a corresponding block of data associated with the metric as well as reading the corresponding block of data and reporting based on information in said corresponding block.

10. One or more processor readable storage devices according to claim 9, wherein said processor readable code further comprises:

an appender, said converter creates a set of data structures for a set of time periods, said appender aggregates said set of data structures to a single data structure.

11. One or more processor readable storage devices according to claim 9, wherein said processor readable code further comprises:

a down sampler, said down sampler creates down sampled data structures from original data structures in said second format.

12. One or more processor readable storage devices according to claim 9, wherein:

said information for a metric over multiple time periods includes a set of records that are individually compressed.

* * * * *